(12) United States Patent
Schneider

(10) Patent No.: US 6,993,594 B2
(45) Date of Patent: Jan. 31, 2006

(54) METHOD, PRODUCT, AND APPARATUS FOR REQUESTING A RESOURCE FROM AN IDENTIFIER HAVING A CHARACTER IMAGE

(76) Inventor: Steven Schneider, 750 La Playa St. Ste. 710, San Francisco, CA (US) 94121

( * ) Notice: Subject to any disclaimer, the term of this patent is extended or adjusted under 35 U.S.C. 154(b) by 938 days.

(21) Appl. No.: 09/838,399

(22) Filed: Apr. 19, 2001

(65) Prior Publication Data

US 2002/0156866 A1 Oct. 24, 2002

(51) Int. Cl.
*G06F 15/16* (2006.01)

(52) U.S. Cl. .................. 709/245; 709/219; 709/217; 709/212

(58) Field of Classification Search .......... 709/203, 709/217, 219, 225, 226, 229, 216, 218, 228, 709/245

See application file for complete search history.

(56) References Cited

U.S. PATENT DOCUMENTS

| | | |
|---|---|---|
| 4,201,887 A | 5/1980 | Burns |
| 4,492,162 A | 1/1985 | Nettesheim et al. |
| 4,570,235 A | 2/1986 | Kerdoncuff et al. |
| 4,571,699 A | 2/1986 | Herzog et al. |
| 4,606,065 A | 8/1986 | Beg et al. |
| 4,682,158 A | 7/1987 | Ito et al. |
| 4,700,378 A | 10/1987 | Brown |
| 5,680,223 A | 10/1997 | Cooper et al. |
| 5,764,906 A | 6/1998 | Edelstein et al. |
| 5,869,819 A | 2/1999 | Knowles et al. |
| 5,889,886 A | 3/1999 | Mahoney |
| 5,901,329 A | 5/1999 | Kito |
| 5,933,525 A | 8/1999 | Makhoul et al. |
| 5,982,303 A | 11/1999 | Smith |
| 5,991,816 A * | 11/1999 | Percival et al. ............. 709/247 |
| 5,999,525 A | 12/1999 | Krishnaswamy et al. |
| 6,005,972 A | 12/1999 | Fredlund et al. |
| 6,012,102 A | 1/2000 | Shachar |
| 6,064,383 A | 5/2000 | Skelly |
| 6,069,622 A | 5/2000 | Kurlander |
| 6,070,167 A | 5/2000 | Qian et al. |
| 6,076,121 A | 6/2000 | Levine |
| 6,101,274 A | 8/2000 | Pizano et al. |
| 6,122,403 A | 9/2000 | Rhoads |
| 6,131,095 A | 10/2000 | Low et al. |
| 6,154,738 A | 11/2000 | Call |
| 6,166,735 A | 12/2000 | Dom et al. |
| 6,542,933 B1 * | 4/2003 | Durst et al. ................. 709/229 |

* cited by examiner

*Primary Examiner*—Saleh Najjar
*Assistant Examiner*—Sargon Nano

(57) ABSTRACT

One or more character image elements can be detected from an identifier that includes a character image of an emoticon, the image elements including a base image identifier and character modifier identifier. After detection at least one uniform resource identifier component corresponding to said at least one character image element can be generated. After component generation a uniform resource locator (URL) including said at least one uniform resource identifier component can be generated. After URL generation, a network resource can be requested from the URL.

13 Claims, 15 Drawing Sheets

FIG. 10-1
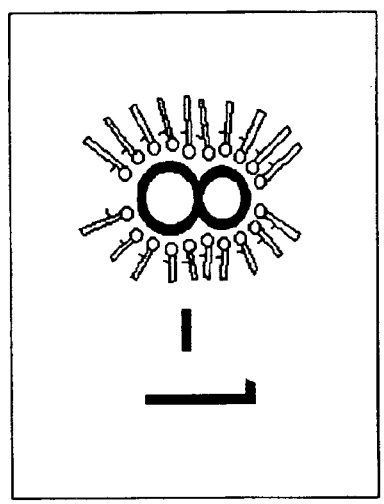 
FIG. 10-2
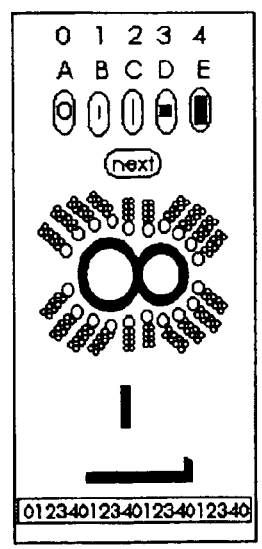 

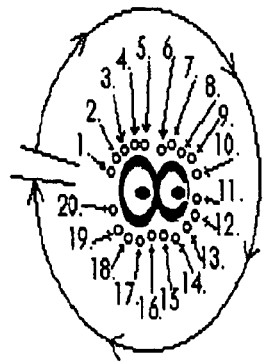
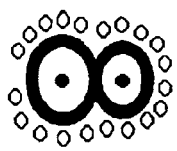
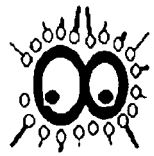
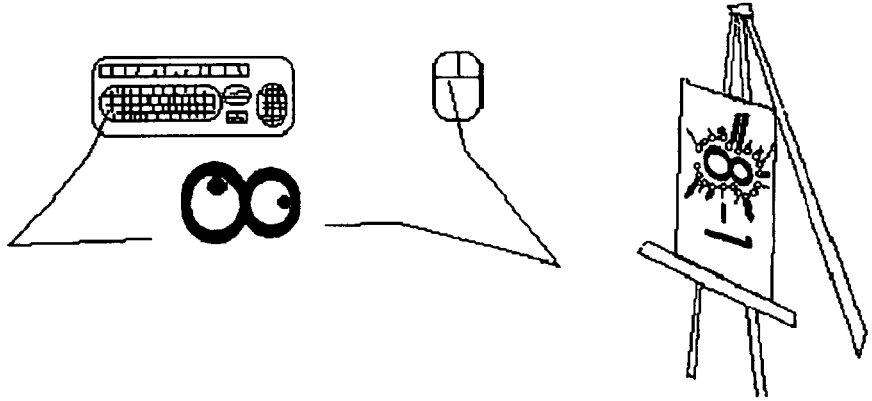
Name, Phrase Business, City, State, Country, Telephone
SEARCH　　　CREATE
FIG. 10-4

METHOD, PRODUCT, AND APPARATUS FOR REQUESTING A RESOURCE FROM AN IDENTIFIER HAVING A CHARACTER IMAGE

FIELD OF THE INVENTION

This invention generally relates to resource location, and more specifically relates to a method, product, and apparatus for requesting a resource from an identifier having a character image.

BACKGROUND OF THE INVENTION

In the same way that a street address represents a location in the physical world, a domain name can be used to represent a location on the Internet. In the physical world, one relies on both street addresses and the postal system to send information back and forth between individuals and organizations. On the Internet, one relies on the Domain Name System (DNS) to translate domain names into Internet addresses.

In general, names are thought of as discrete emblems used to establish or designate identity; addresses are thought of as emblems designating location. Domain names might seem to be unusual because they appear to be both names and addresses; they both locate and identify Internet resources. Yet people's personal names, for example, establish identity, and such identifiers travel with the individual rather than changing when the person changes location. Other attributes of an individual such as handwriting, fingerprints, DNA, and face recognition may also serve to identify and help remember the individuality of a person. Street addresses or geographic names, by contrast, are more static in order to establish location. Yet such addresses and geographic names also serve to identify the physical place, differentiating it from other places.

Geographic names of all kinds—street addresses, zip codes, counties—are in fact overlays on an unchanging numerical system of longitude and latitude, which is a universally recognized designator and locator for a particular place on the earth's surface. In this sense, geographic names are much like Internet domain names, which are an overlay of Internet address number designations.

Name space is a set of names in which all names are unique. Address space is a set of addresses in which all addresses are unique. Image space is a set of images in which all images are unique. Names are commonly used as mnemonic devices to help remember information. For instance, names are used to remember telephone numbers, and domain names are used to remember Internet addresses. A recent area of worldwide concern is the allocation of name space on the Internet.

The Internet is a vast computer network having many smaller networks that span the world. A network provides a distributed communicating system of computers that are interconnected by various electronic communication links and computer software protocols. Because of the Internet's distributed and open network architecture, it is possible to transfer data from one computer to any other computer worldwide. In 1991, the World-Wide-Web (WWW or Web) revolutionized the way information is managed and distributed.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may provide the data and a client computer may display or process it. TCP may then convert messages into streams of packets at the source, then reassemble them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

Client side browsers, such as Netscape Navigator and/or Microsoft Internet Explorer (MSIE) provide graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side browser reads these codes in order to display the page. A web page may be static and requires no variables to display information or link to other predetermined web pages. A web page is dynamic when arguments are passed which are either hidden in the web page or entered from a client browser to supply the necessary inputs displayed on the web page. Common Gateway Interface (CGI) is a standard for running external programs from a web server. CGI specifies how to pass arguments to the executing program as part of the HTTP server request. Commonly, a CGI script may take the name and value arguments from an input form of a first web page which is be used as a query to access a database server and generate an HTML web page with customized data results as output that is passed back to the client browser for display.

The Web is a means of accessing information on the Internet that allows a user to "surf the web" and navigate the Internet resources intuitively, without technical knowledge. The Web dispenses with command-line utilities, which typically require a user to transmit sets of commands to communicate with an Internet server. Instead, the Web is made up of millions of interconnected web pages, or documents, which may be displayed on a computer monitor. Hosts running special servers provide the Web pages. Software that runs these Web servers is relatively simple and is available on a wide range of computer platforms including PC's. Equally available is a form of client software, known as a Web browser, which is used to display Web pages as well as traditional non-Web files on the client system.

A network resource identifier such as a Uniform Resource Identifier (URI) is a compact string of characters for identifying an abstract or physical resource. URIs are the generic set of all names and addresses that refer to objects on the Internet. URIs that refer to objects accessed with existing protocols are known as Uniform Resource Locators (URLs). A URL is the address of a file accessible on the Internet. The URL contains the name of the protocol required to access the resource, a domain name, or IP address that identifies a specific computer on the Internet, and a hierarchical description of a file location on the computer. For example the URL "http://www.example.com/index.html", where "http" is the scheme or protocol, "www.example.com" is the Fully Qualified Domain Name (FQDN), and "index.html" is the filename located on the server.

Because an Internet address is a relatively long string of numbers (e.g., 31.41.59.26) that is difficult to remember, Internet users rely on domain names, memorable and sometimes catchy words corresponding to these numbers, in order to use electronic mail (e-mail) and to connect to Internet sites on the Web. The Domain Name System (DNS) is a set of protocols and services on a network that allows users to utilize domain names when looking for other hosts (e.g., computers) on the network. The DNS is composed of a distributed database of names. The names in the DNS database establish a logical tree structure called the domain name space. Each node or domain in the domain name space is named and may contain subdomains. Domains and subdomains are grouped into zones to allow for distributed administration of the name space.

There is a particular increase in articles and publications emphasizing the importance of domain name space and the perceived shortage of ".com" names. References have been made that NASA is seeking authorization for ".mars" as an extension of terrestrial geography. Speaking on the opening day of the annual Internet Society (ISOC) conference in Geneva on Jul. 22, 1998, Vint Cerf, a founding President of ISOC, said the domain name debate should also encompass ".earth" or ".mars" because that's where real-time science data is going to travel from in the not-too-distant future. He said, "The idea is to take the interplanetary Internet design and make it a part of the infrastructure of the Mars mission."

Ironically that same day, an on-line Wired News article reports that Netword LLC has sued Centraal Corp. for patent infringement on its Internet keyword system. The system uses plain language instead of URLs to retrieve Web addresses. The technology lets companies and site owners register simple keywords that browsers can use to access Web sites. "Chevy," for example, could be used as an alias to replace the lengthier Web address "http://www.chevrolet.com". The system works using a client browser plug-in. U.S. Pat. No. 5,764,906 issued on Jun. 9, 1998, by Edelstein et al. and assigned to Netword LLC, entitled, "Universal electronic resource denotation, request and delivery system" is a system that works by users guessing a short mnemonic alias without the user being required to know the Web page's URL.

A system or process is typically modeled by defining the elements or components within such a system and further defining the corresponding relationships of such elements with each other and/or the relationships of such elements to other systems and their respective elements. Elements or components are most typically defined as objects having properties or functions associated with such objects. Objects are distinguished by assigning a unique identifier for each object creating an object space. Identifiers are symbols, markings, characters, names, or labels used for distinguishing, tracking, tagging, coding, sorting, routing, locating, linking, and organizing any combination of objects, resources, and addresses of a given system or across multiple systems. Indicia are identifiers used for referencing objects of physical or abstract resources.

An identifier is static and has a persistence that usually takes the form of a name or label to help people remember and commonly agree upon the identification of an object for a given system. In effect, for any given object space there is typically defined an associated naming system. Each naming system may include one or more namespaces. In some naming systems, identifiers may be allocated, assigned, reserved, subscribed, or registered to an object or entity such as an individual or organization. Examples of such registered identifiers include Social Security Numbers (SSN), license plate numbers, Universal Product Codes (UPC), International Standard Book Numbers (ISBN), trademarks, tradenames, company names, stock symbols, broadcast station call letters, telephone numbers, domain names, keywords, FDNs, screen names, user names, etc.

Each naming system has respectively originated and evolved for its own reasons, in its own way and in its own time. Identifiers take on meaning only from within its own naming system and generally remains exclusive to other naming systems. In recent years, identifiers are beginning to persist across other naming systems. For instance, there is a recent correlation between telephone numbers and trademarks. During the early 1970's, as 1-800 toll free numbers were introduced, industry recognized and extended the use of mnemonics for commercial advertising and name branding. During the 1980's, 1-800 names were popularized to the point where brokers would buy names with the hope of selling or leasing the 1-800 names from their growing portfolio. In fact, courts have almost unanimously held that telephone mnemonics may be protected as trademarks.

Another cited patent that relies on a translation database to retrieve URLs and access resources. U.S. Pat. No. 5,812,776 issued on Sep. 22, 1998 by Gifford, entitled, "Method of providing internet pages by mapping telephone number provided by client to URL and returning the same in a redirect command by server" allows a user to access a hypertext page by providing a conventional telephone number or other descriptor. The server maps such a telephone number or descriptor to a target page identifier using a translation database and automatically directs the client to retrieve the desired page.

There are other methods for locating resources such as image recognition, for example. U.S. Pat. No. 5,680,223 issued on Oct. 21, 1997 by Cooper, et al., entitled, "Method and system for labeling a document for storage, manipulation, and retrieval" establishes a relationship between an arbitrary, image domain file label and a computer recognizable text domain file name for the file. The arbitrary, image domain file label facilitates the meaningful naming of a file for storage when a keyboard or other typical text entry apparatus is unavailable.

Something most individuals have in common is having a face. A face with eyes, a nose and a mouth. All faces look a little different from each other. Different facial features help distinguish one face from another. Facial features help most people recognize a face that they have seen before. Facial features in a sense are information for people to recognize other people's face. What is surrounding ones face is recognized also, for instance, picture a man on a sunny day in front of a record store named "Vinyl Press" and he is wearing a blue suit and carrying a drum. You hear an audio recording of his drum music or you see a video being played on a TV screen. You see his face brighten up emotionally when a girl playing a guitar walks by. All the information around that face mixed with the emotion expressed in that face help in the recognition of said face.

The alphanumeric keys located on any typewriter or keyboard are used to create character images. Large groups of people everyday use character images every day to express an emotion. Character images are recognized as images to most people that view them. A character image that reflects an emotion a human being is feeling is called an Emoticon. Other examples of character images are, B-1 and :-1.

U.S. Pat. No. 6,064,383 issued on May 16, 2000 by Skelly, entitled, "Method and system for selecting an emotional appearance and prosody for a graphical character" enables the user to select an emotion for a graphical character and intensity of the emotion to be reflected in the appearance of the character by using an input device. For instance, Microsoft Office (a well-known word processing program) may automatically turn a colon, hyphen, close parentheses J into a happy face, J. So does AOL Instant Messenger (a well-known communication program).

U.S. Pat. No. 6,069,622 issued on May 30, 2000 by Kurlander, entitled, "Method and system for generating comic panels" discloses how an emoticon in a communication environment can relay communication and emotion within a series of comic panels. The comic generation system receives an interaction event and generates a comic panel. Examples of interaction events include text input (e.g., a character image) by a user and selection of gestures and expressions by a user.

Character images and emoticons may also be used in Virtual Reality. A virtual environment may be generated from a programming language called, Virtual Reality Markup Language (VRML). In a virtual environment everything looks 3D and as if one is existing in it. Another virtual environment which is very popular today is the 3D gaming environment. Such games that are popular today are Quake and Dune where real people play an interactive game off or online. In a virtual environment or interactive game real people take on a graphic presence known as an avatar. Most avatars have a face. In essence a face of an avatar is almost the same as a face of an emoticon in which they both exist in a computer based environment an are used to relay emotion and a message. They are vehicles for mnemonic information to the things we humans communicate and associate with.

A character image more particularly an emoticon is different then a lot of other symbols for its ability of being scanned and recognized by a multitude of devices and formats that exist.

U.S. Pat. No. 6,076,121 issued on Jun. 13, 2000 by Levine, entitled, "Method of network addressing and translation" discloses a system and method in a telephone network for assigning a directory number to each user, and functional property code(s) to each device a user employs. The same directory number is then used to reach the user, whereby the system will automatically use the functional property code of each device to reach the user's voice line, cellular line, fax line, data line or other telephone network device.

U.S. Pat. No. 6,154,738 issued on Nov. 28, 2000 by Call, entitled, "Methods and apparatus for disseminating product information via the internet using universal product codes" receives Internet request messages containing all or part of a universal product code and returns the Internet address at which information about the identified product, or the manufacturer of that product, may be obtained.

This supports the need for a system that labels products on a computer network. There are other devices that can communicate on these infrastructures and recognize a symbol include, systems that work with imagery and text.

U.S. Pat. No. 4,606,065 issued on Aug. 12, 1986 by Beg, et al., entitled, "Image processing-system" discloses an encoder that receives digital level signals and generates an indicator, in the histogram mode, of the bin to which the picture elements currently being examined belongs. In the feature-identification mode, the encoder generates an indication of whether the current picture element has the selected feature. These indications that the encoder produces will be referred to in this specification as "code signals," and the general purpose of the encoder can thus be described as being to provide a correspondence between level signals and code signals.

U.S. Pat. No. 5,933,525 issued on Aug. 3, 1999 by Makhoul, et al., entitled, "Language-independent and segmentation-free optical character recognition system and method" discloses a unique feature extraction approach which represents two dimensional data relating to OCR as one independent variable (specifically the position within a line of text in the direction of the line) so that the same CSR technology based on HMMs can be adapted in a straight-forward manner to recognize optical characters.

U.S. Pat. No. 5,909,211 issued on Jun. 1, 1999 by Combs, et al., entitled, "Touch pad overlay driven computer system" discloses a pressure sensitive touch pad and an overlay depicting a pattern, e.g., a typewriter keyboard, for providing specific data characteristics of the pattern to a host computer and to a specific application program.

U.S. Pat. No. 4,570,235 issued on Feb. 11, 1986 by Kerdoncuff, et al., entitled, "Digital receiver of multi-frequency signals with frequency recognition device" discloses digital frequency recognition device for a receiver of multi-frequency PCM signals, for the signaling between automatic telephone exchanges or between subscribers and telephone exchanges.

Other markings such as ink stamps and the like may also be used to encode identifiers within images and be printed, scanned and translated to a directory location on a computer.

U.S. Pat. No. 4,492,162 issued on Jan. 8, 1985 by Nettesheim, et al., entitled, "Type band ink stamp" discloses an ink stamp having movable type bands, however there is no mention of using encoded identifiers to access resources.

U.S. Pat. No. 4,571,699 issued on Feb. 18, 1986 by Herzog, et al., entitled, "Optical mark recognition for controlling input devices, hosts, and output devices" discloses a document distribution network having one or more input work stations, a linking network with one or more nodes and one or more output work stations, is controlled by a job control sheet. The job control sheet is partitioned into a plurality of control zones. Each zone contains dedicated marked sense information for controlling the input work stations, the network nodes and the output work stations.

Other devices may also be adapted for use in image recognition and network resource translation.

U.S. Pat. No. 6,166,735 issued on Dec. 26, 2000 by Dom, et al., entitled, "Video story board user interface for selective downloading and displaying of desired portions of remote-stored video data objects" discloses a system and method for supporting video browsing over a communication network such as the Internet/World Wide Web. A GUI is provided through a client software tool such as a Web browser. A client/user selects a video data object stored at a remote server. A set of points within the object are displayed at the client's graphical user interface display, as representations, preferably thumbnail images, of the points within the object.

U.S. Pat. No. 4,682,158 issued on Jul. 21, 1987 by Ito, et al., entitled, "Guidance device for manipulation of machine" discloses a machine having a control panel with a plurality of keys controlling various functions. A display exhibits prompts as to the proper operation of the machine. An operator can learn the functions of the keys by manipulating them and observing the resulting prompts.

U.S. Pat. No. 6,012,102 issued on Jan. 4, 2000 by Shachar, et al., entitled, "System using machine-readable printed symbols created from encoded data resource specifiers to establish connection to data resource on data communications network" discloses how access to data resources on data communications networks is simplified by encoding data resource identifiers into a machine-readable printed symbol which can be scanned into a computer-based data communications terminal. The machine-readable printed symbol can be a bar code or in the form obtainable with any other printed encoding technology which encodes digital information in printed form so that it can be electronically read.

U.S. Pat. No. 4,201,887 issued on May 6, 1980 by Burns, entitled, "Data telecommunications terminal" discloses a portable, hand-held data telecommunications terminal for use with a telephone system having a memory for storing data, a signal generator for generating signals corresponding to the data, a signal coupling device connected to the signal generator for coupling the signals to the telephone system, a keyboard, a microprocessor, and a self-contained power supply. Data is entered into the memory from the keyboard device so that the data is available at a future time, to be coupled to the telephone system.

U.S. Pat. No. 5,982,303 issued on Nov. 9, 1999 by Smith, entitled, "Method for entering alpha-numeric data" discloses a method for transforming ordered pairs of keystrokes entered on a keypad with eight or more keys into a full complement of alpha-numeric characters, as might be enterable from a computer keyboard. Examples of input devices include a numeric keypad, a telephone keypad, and a "joystick." The method employs an alphabet in which each character is represented by a two-stroke pictographic figure.

U.S. Pat. No. 6,131,095 issued on Oct. 10, 2000 by Low, et al., entitled, "Method of accessing a target entity over a communications network" discloses a telephone network and the target entity is a called party; in this case, the number string comprises a dialed number and the retrieved communication data is a URI indicative of the location on the Internet of a current telephone number for the target party, the URI once retrieve being used to access the current telephone number over the Internet for use in setting up a call to the target party.

U.S. Pat. No. 5,869,819 issued on Feb. 9, 1999 by Knowles, et al., entitled, "Internet-based system and method for tracking objects bearing URL-encoded bar code symbols" discloses a Web-based package routing, tracking and delivering system and method that uses URL/ZIP-CODE encoded bar code symbols on parcels and packages.

U.S. Pat. No. 6,101,274 issued on Aug. 8, 2000 by Pizano, et al., entitled, "Method and apparatus for detecting and interpreting textual captions in digital video signals" discloses a computer-implemented method for the identification and interpretation of text captions in an encoded video stream of digital video signals comprises sampling by selecting frames for video analysis, decoding by converting each of frames selected into a digitized color image, performing edge detection for generating a grey scale image, binarizing by converting the grey scale image into a bi-level image by means of a thresholding operation, compressing groups of consecutive pixel values in the binary image, mapping the consecutive pixel values into a binary value, and separating groups of connected pixels and determining whether they are likely to be part of a text region in the image or not.

U.S. Pat. No. 5,999,525 issued on Dec. 7, 1999 by Krishnaswamy, et al., entitled, "Method for video telephony over a hybrid network" discloses how telephone calls, data and other multimedia information including video, audio and data may be routed through a switched network which includes transfer of information across the internet. Users can transmit video, audio and data communications of designated quality over the Internet to other registered video telephony users. Users can manage more aspects of a network than previously possible, and control network activities from a central site.

U.S. Pat. No. 6,070,167 issued on May 30, 2000 by Lian, et al., entitled, "Hierarchical method and system for object-based audiovisual descriptive tagging of images for information retrieval, editing, and manipulation" discloses selecting an object of interest in an image with an object-based selection mechanism, generating a hierarchical data structure for the image and for associating auxiliary information with the image, and transmitting/storing the image and the hierarchical data structure.

U.S. Pat. No. 6,169,555 issued on Jan. 2, 2001 by Yamamoto, entitled, "System and methods for communicating through computer animated images" discloses a method and system for generating an animation sequence for a live character during communication. In response to a performer's voice and other inputs, the animation sequence of the character is generated on a real-time basis and approximates human speech. The animated character is capable of expressing certain predetermined states of mind such as happy, angry and surprised. In addition, the animated character is also capable of approximating natural movements associated with speech U.S. Pat. No. 5,901,329 issued on May 4, 1999 by Kito, entitled, "Data processing terminal which determines a type of an external device" discloses a data processing terminal capable of determining the type of an external device such as a bar code reader connected thereto and of converting a control command in a predetermined format into one in another format, so that the data processing terminal can employ a single program to control bar code readers which use different command systems.

All of the above formats and devices open up a device based communication network. The lack of web addresses that can fairly relay ones element of character or service could be fixed if all said prior art worked together on a system designed for the use of imagery as addresses.

There is a strong need for an addressing system that is recognized by machine, as well as by most humans. There is a strong need for a new gateway for images and media to be addressed on a computer and communication network. The addressing system today does not provide full use of name space. Image space is a missing link for all said inventions to work simultaneously and harmoniously.

There is an increasing need to offer other alternatives of recognition to help remember an online destination. Accordingly, in light of the above, there is a strong need in the art for a method, product, and apparatus for requesting a resource from an identifier having a character image.

SUMMARY OF THE INVENTION

In general, in accordance with the present invention a method for requesting a resource from an identifier having a character image includes the steps of generating a first uniform resource identifier (URI) from the character image, wherein the first URI can locate the resource, and requesting the resource from the first URI.

In accordance with yet additional aspects of the present invention, a system which implements substantially the same functionality in substantially the same manner as the methods described above is provided.

In accordance with other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

DETAILED DESCRIPTION OF THE INVENTION

Figure 1:
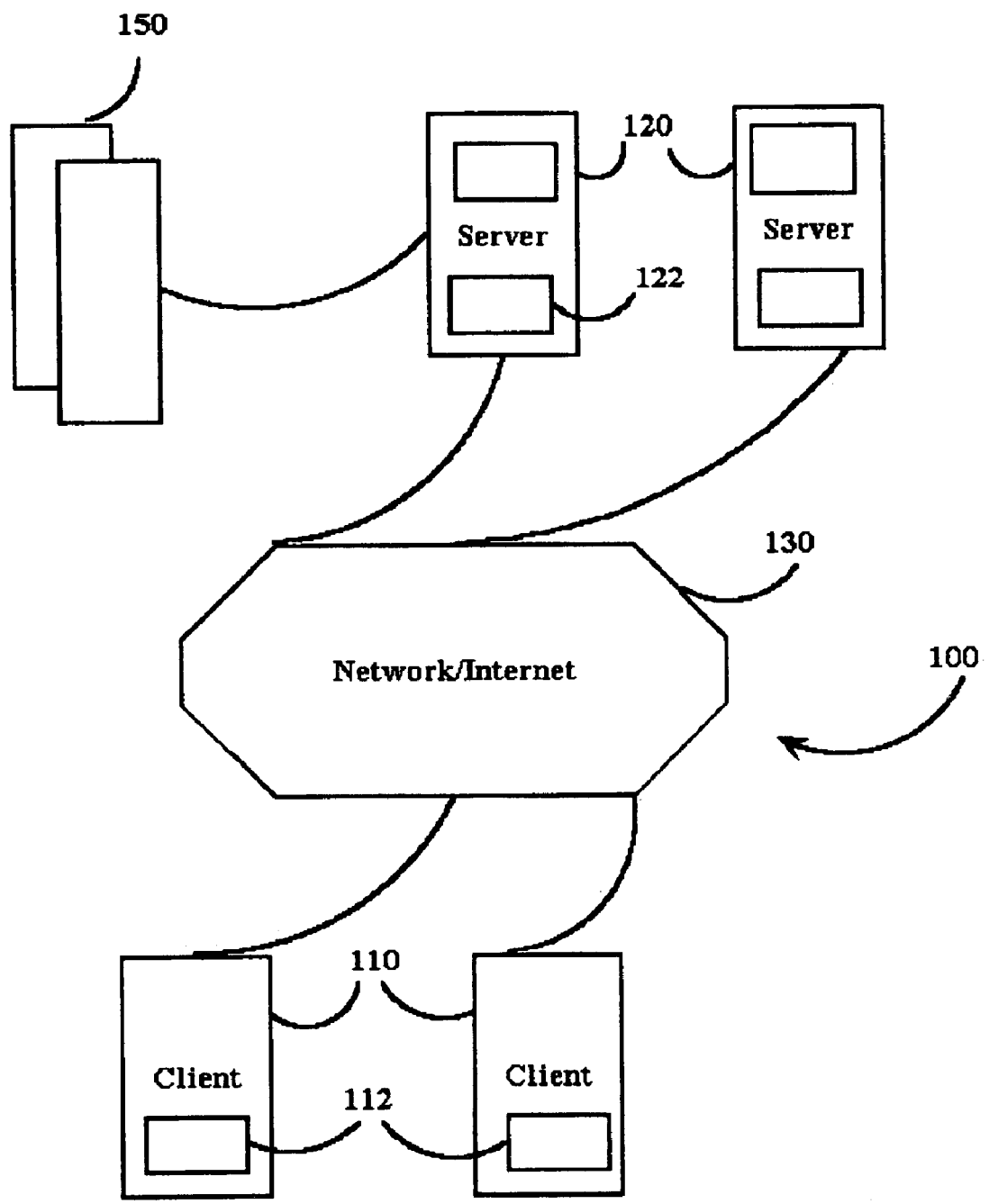
FIG. 1 is an illustration of a distributed computer system in accordance with the present invention.

The present invention will now be described with reference to the drawings, wherein like reference numerals are used to refer to like elements throughout.

Turning first to the nomenclature of the specification, the detailed description which follows is represented largely in terms of processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices. Each of these conventional distributed computing components is accessible to the local processing unit by a communication network.

The processes and operations performed by the computer include the manipulation of data bits by a local processing unit or remote server and the maintenance of these bits within data structures resident in one or more of the local or remote memory storage devices. These data structures impose a physical organization upon the collection of data bits stored within a memory storage device and represent specific electrical or magnetic elements. Symbolic representations are the means used by those skilled in the art of computer programming and computer construction to most effectively convey teachings and discoveries to others skilled in the art.

For the purposes of this discussion, a process is generally defined as being a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering, etc., which are often associated with manual operations performed by a human operator. The operations described herein are machine operations performed in conjunction with various input provided by a human operator or user that interacts with the computer. The machines used for performing the operation of the present invention include local or remote general-purpose digital computers or other similar computing devices including telephones.

In addition, it should be understood that the programs, processes, method, etc. described herein are not related or limited to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

FIG. 1 shows a distributed computer system 100. The distributed system 100 includes client computers or any network access apparatus 110 connected to server computers 120 via a network 130. The network 130 can use Internet communications protocols (IP) to allow the clients 110 to communicate with the servers 120. The network access apparatus 110 further includes a modem or like transceiver to communicate with the electronic network 130. The modem can communicate with the electronic network 130 via a line such as a telephone line, an ISDN line, a coaxial line, a cable television line, a fiber optic line, or a communication network line. Alternatively, the modem can wirelessly communicate with the electronic network 130. The electronic network 130 can be provided by an on-line service, an Internet service provider, a local area network service, a wide area network service, a cable television service, a wireless data service, an intranet, a satellite service, or the like.

The client computers 110 can be any network access apparatus including hand held devices, palmtop computers, personal digital assistants (PDAs), notebook, laptop, portable computers, desktop PCs, workstations, or larger or smaller computer systems. It is noted that the network access apparatus can have a variety of forms, including but not limited to, a general purpose computer, a network computer, a network television, an internet television, a set top box, a web-enabled telephone, an internet appliance, a portable wireless device, a television receiver, a game player, a video recorder, or an audio component.

Each client 110 typically includes one or more processors, memories, and input/output devices. An input device can be any suitable device for the user to give input to client computer 110; for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, scanner, a voice, speech or music recognition unit, remote control attached via cable or wireless link to a game set, television, or cable box, a stencil that fits over a computerized drawing tablet, screen capture recognition in a multi-formatted environment. A data glove, an eye-tracking device, or any MIDI device could also be used. A display device could be any suitable output device, such as a display screen, text-to-speech converter, printer, plotter, fax, television set, video telephone, or audio player. Although the input device is typically separate from the display device, they could be combined; for example: a display with an integrated touchscreen, a display with an integrated keyboard, or a speech-recogniton unit combined with a text-to-speech converter.

The servers 120 can be similarly configured. However, in many instances server sites 120 include many computers, perhaps connected by a separate private network. In fact, the network 130 may include hundreds of thousands of individual networks of computers. Although the client computers 110 are shown separate from the server computers 120, it should be understood that a single computer could perform the client and server roles.

During operation of the distributed system 100, users of the clients 110 desire to access information records 122 stored by the servers 120 using, for example, the World-Wide-Web (WWW), or in short the "Web." The records of information 122 can be in the form of Web pages 150. The pages 150 can be data records including as content plain textual information, or more complex digitally encoded multimedia content, such as software programs, graphics, audio signals, videos, and so forth.

It should be understood that although this description focuses on locating information on the World-Wide-Web, the system can also be used for locating information via other wide or local area networks (WANs and LANs), or information stored in a single computer using other communications protocols.

The clients 110 can execute Web browser programs 112, such as Netscape Navigator or MS Internet Explorer to locate the pages or records 150. The browser programs 112 allow the users to enter addresses of specific Web pages 150 to be retrieved. Typically, the address of a Web page is specified as a Uniform Resource Identifier (URI) or more specifically as a Uniform Resource Locator (URL). In addition, once a page has been retrieved, the browser programs 112 can provide access to other pages or records by "clicking" on hyperlinks to previously retrieved Web pages. Such hyperlinks provide an automated way to enter the URL of another page, and to retrieve that page.

Figure 2:
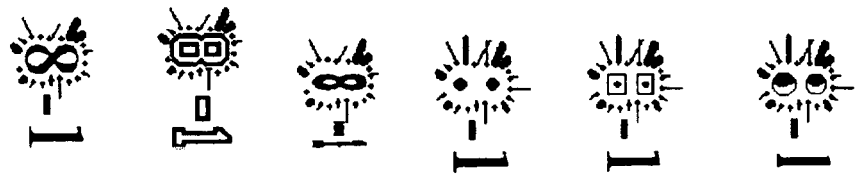
FIG. 2 is an illustration of a base character image surrounded by five different kinds of character modifiers within a given scheme.

FIG. 2 In this illustration there are base character images made with the alpha numeric on a typing keyboard to create a base character image of an emoticon that is a face. E.g. 8-1, :-). In FIG. 2 there are illustrations of character images that are surrounded by twenty character modifiers which in this case take on the appearance of the facial feature, eyelash follicles, and are detached or attached to the eyes of the base character image of a face. An eyelash follicle/character modifier can hold many different kinds of distinguishable shaped character modifiers, which in this case take on the appearance of the facial feature eyelashes. There can be more or less or a different kind of eyelash/character modifiers to encode a base character image where the eyelash facial feature would fit in with the base character image that is created when using characters from an ASCII format.

Figure 3:
FIG. 3 is an illustration of four different character modifiers within the scheme in FIG. 2.

FIG. 3 is an illustration of four different kinds of character modifiers that take on the appearance of eyelashes when extending from a character modifier that is a hair follicle. An eyelash/character modifier is a line or a mark extending from a hair follicle/character modifier that is surrounding an eyelid on the eye of a base character image of a face.

Four different kinds of eyelash/character modifiers are one thin short eyelash/character modifier, one thin long eyelash/character modifier, one thick short eyelash/character modifier and one thick long eyelash/character modifier.

A short eyelash/character modifier is no longer then a third of the length of the longest eyelash/character modifier extending from the hair follicle/character modifier that is detached from the eyelid of a base character image of a face.

The thin eyelash/character modifier is no thicker then a half of the thickness of the thickest eyelash/character modifier extending from a hair follicle/character modifier that is detached from the eyelid of a base character image of an eye. There are no more then one eyelash/character modifier per hair follicle/character modifier in the calculated outcome of unique numbers created in this scheme described. More possibilities are possible with added eyelashes per follicle or with a different kind of eyelash all together.

Figure 4:
FIG. 4 is a detailed illustration showing a series of reference points for the first four character modifiers in association with a fifth character modifier within the scheme in FIG. 2.

FIG. 4 is an illustration showing why two eyelash/character modifiers are always present. When there is a thick long eyelash/character modifier and a thin short eyelash/character modifier present or a thin long eyelash/character/modifier and a thick short eyelash/character/modifier present. It shows the differentials of height and thickness between eyelash/character modifiers and enables a human or a machine the ability to distinguish what code is present.

Figure 5:
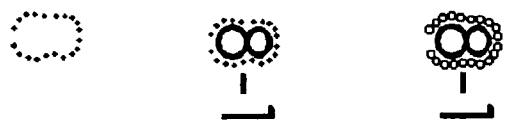
FIG. 5 is a detailed illustration showing a series of reference points for the fifth character modifiers within the scheme in FIG. 2.

FIG. 5 is an illustration of hair follicle/character modifiers. A hair follicle/character modifier is one of twenty tiny circles on an eyelid of a base character image of an eye attached or detached. FIG. 5 also depicts how small a hair follicle/character modifier can be. A hair follicle/character modifier can take on any size or shape that can fit in given space surrounding a base character image of an eye and that can be read by a machine. FIG. 5 also shows a hair follicle/character modifier can be as large as the base character image will allow. There are twenty hair follicle/character modifiers present surrounding and detached from the eyelids of the base character image of a face. There are five hair follicle/character modifiers per eyelid on the base character image.

Figure 6:
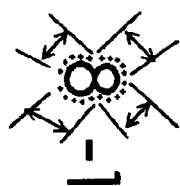
FIG. 6 is an illustration of the regions for the character modifiers within the scheme in FIG. 2.

FIG. 6 is an illustration of four eyelids. An eyelid is the apex of the outer circumference of the top and bottom of the eye in a base character image of a face.

Figure 7:
FIG. 7 is a detailed view of two different base character images.

FIG. 7 is an illustration of the eyes, nose and mouth on a base character image of a face.

Figure 8:
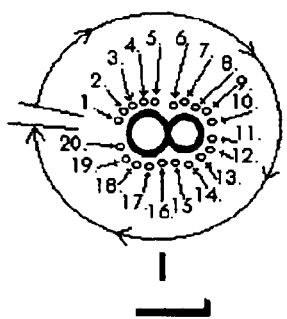
FIG. 8 is an illustration showing the placement and the sequence of the character modifiers that encode a base character image into a translatable image with in the scheme of FIG. 2.

FIG. 8 is an illustration showing the placement and the sequence of character modifiers that take on the appearance of facial features and encode a base character image.

These character modifier/facial features are placed in a coded sequence that can be humanly read or machine read in a clockwise direction beginning at, the first hair follicle/character modifier on the far left of the top left eyelid of a base character image to the last hair follicle/character modifier on the far left of the bottom left eyelid of the base character image. The largest empty space between hair follicle/character modifiers is the gap on the left side of the left eye that is between the beginning and end of the designated sequence.

The largest space between hair follicle/character modifiers signifies where the beginning and end is of the encoded base character image. Twenty is the total number of integrals in this encoded base character image of a face.

Figure 9:
FIG. 9 is an illustration showing the numerical values of the character modifiers used to encode base character images into a translatable image with in the scheme of FIG. 2.

FIG. 9 is an illustration showing values of the facial feature/character modifiers in this example, a hair follicle/character modifier equals a zero.
a short thin eyelash/character modifier equals a one.
a long thin eyelash/character modifier equals a two.
a short thick eyelash/character modifier equals a three.
a long thick eyelash/character modifier equals a four.

There are ninety five trillion, three hundred sixty seven billion, four hundred thirty one million, six hundred forty thousand, six hundred and twenty different combinations when this method is used. More possibilities are possible when added character modifiers.

Figures 3, 10:
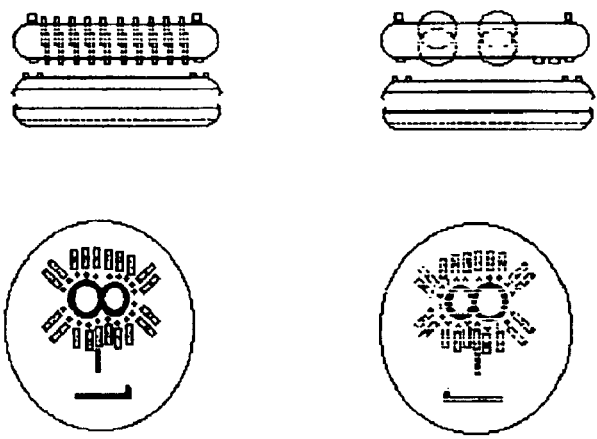
FIG. 10 illustrates devices for translation of a character image into an address.
Figure 10:
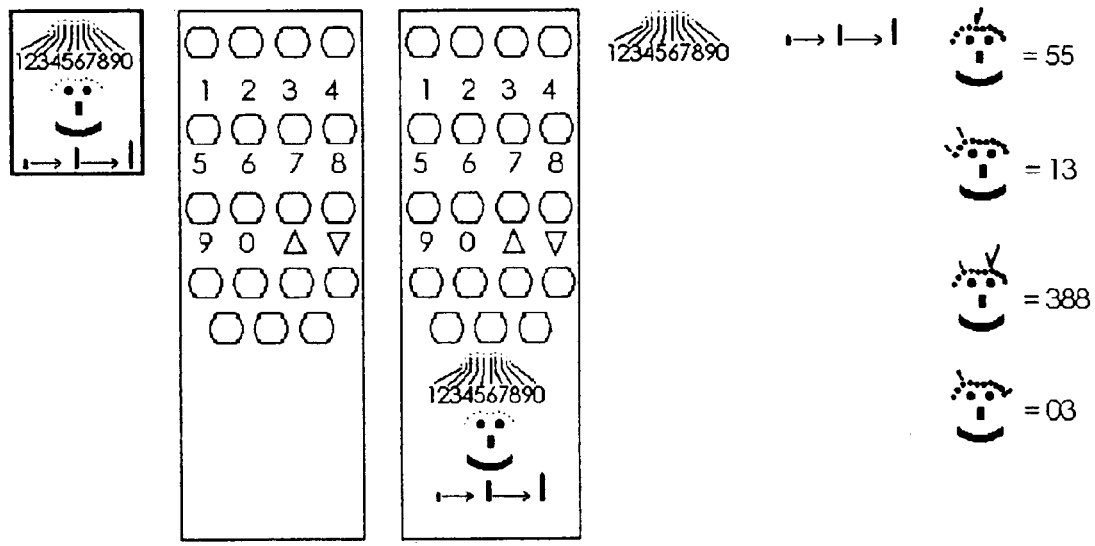
Figure 5:
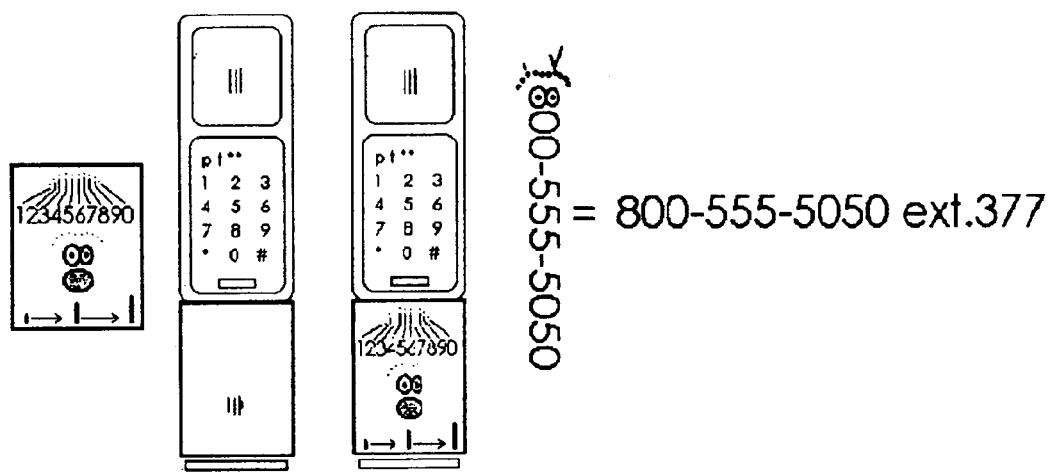
Figures 6, 10:
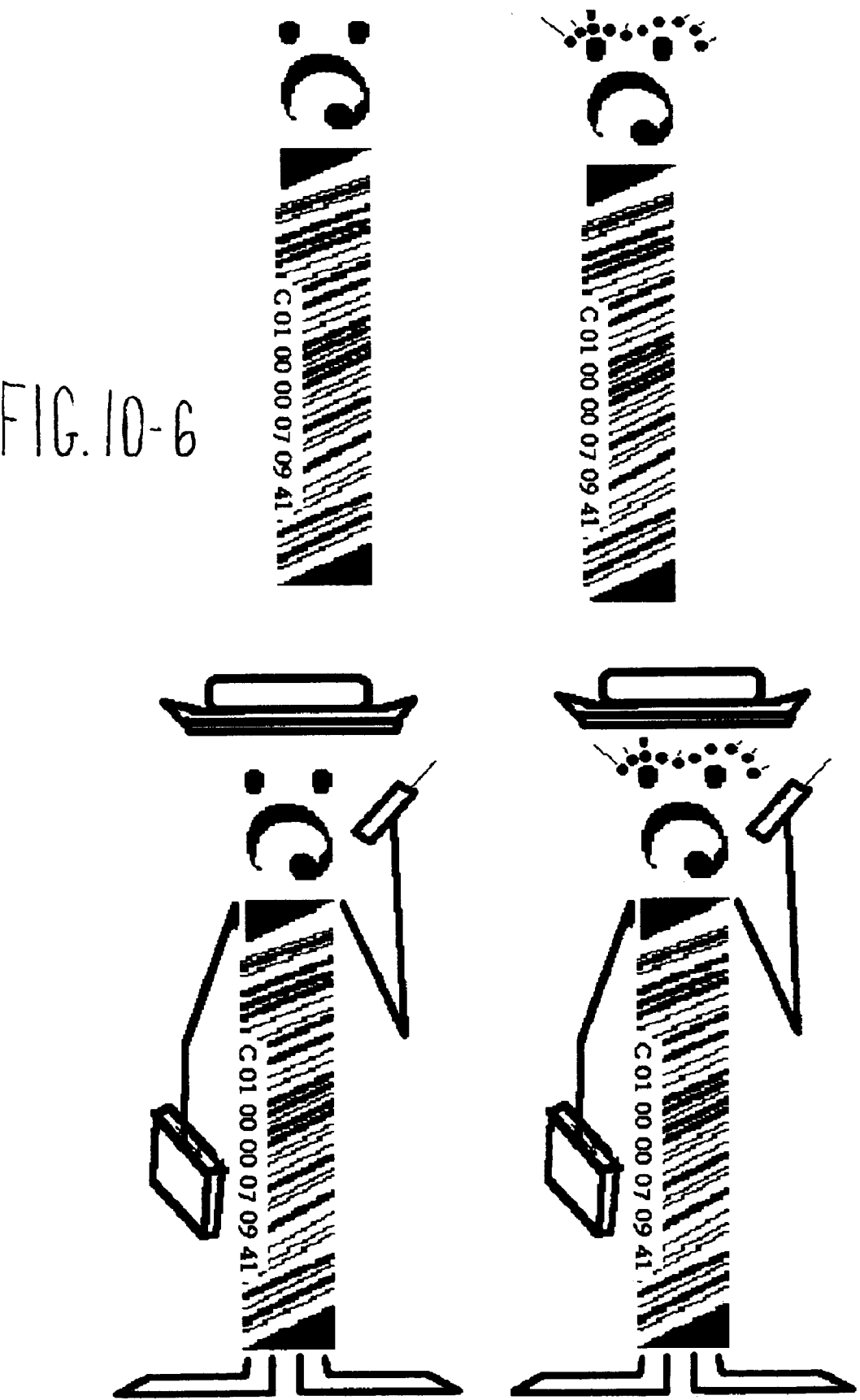
Figures 7, 10:
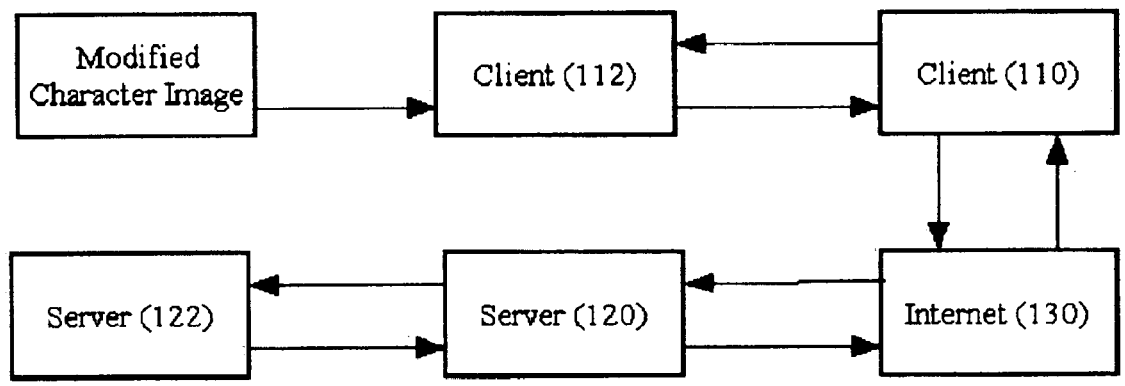
Figures 8, 10:
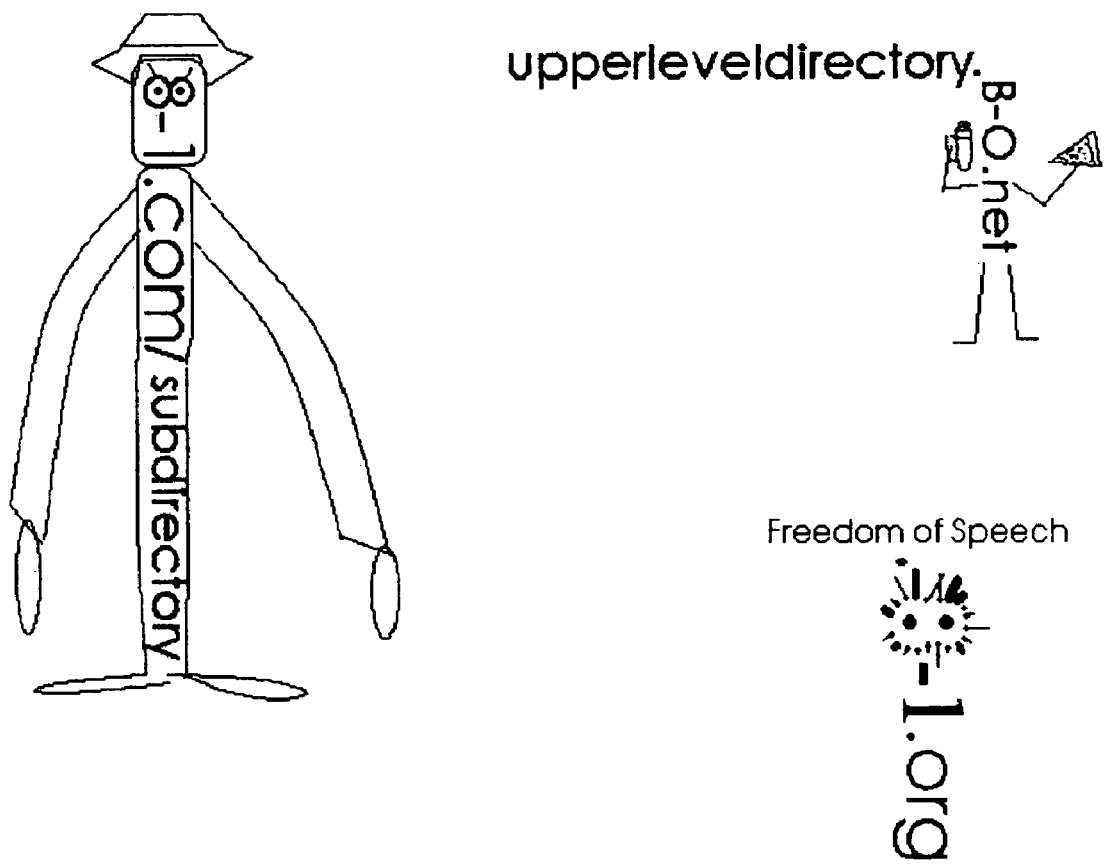
Figures 9, 10:
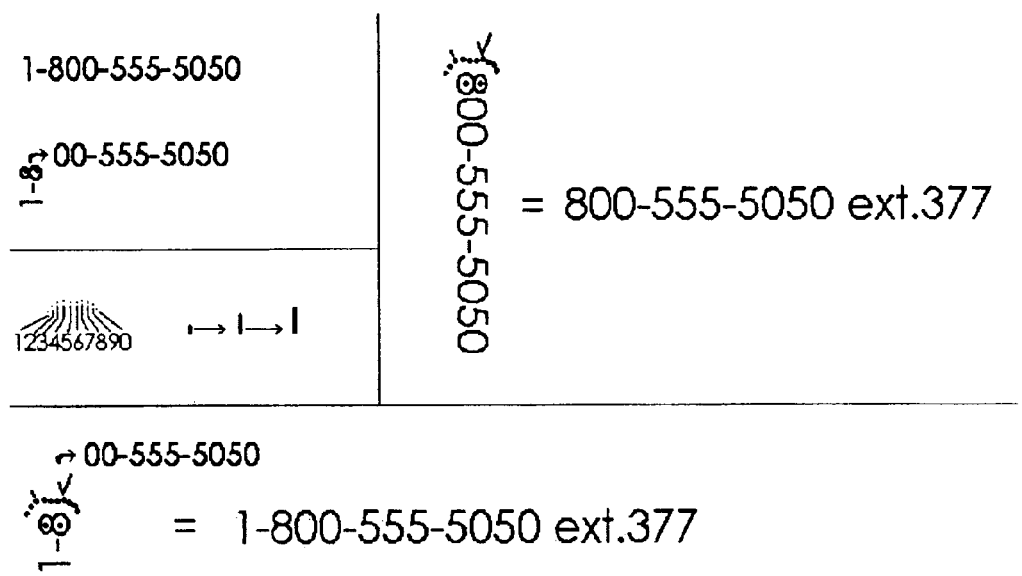
Figure 10:
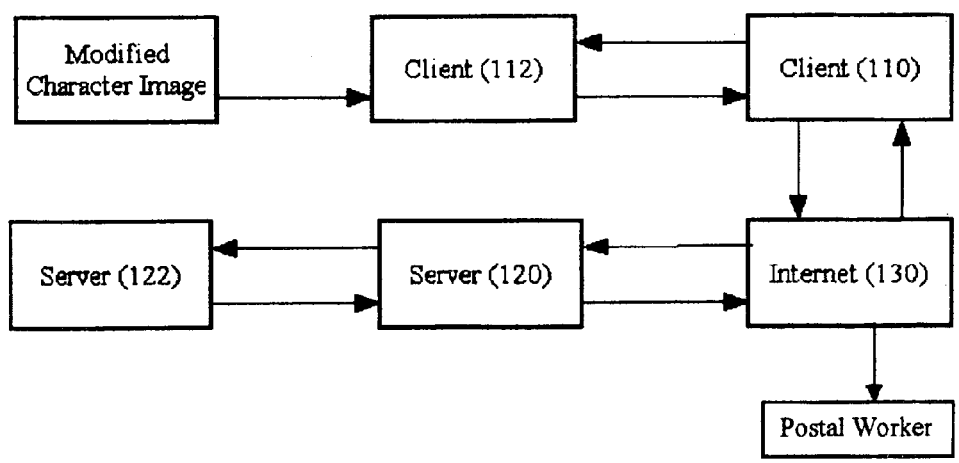

FIG. 10 Illustrations of devices and protocol that translate a base character image and a modified base character image to a location on a computer and a communication network.

10-1. In this example a template has a cut out of a base character image and cutouts of eyelash/character modifiers extending from cutouts of hair follicle/character modifiers. This template fits a touch pad attached to a memory storage device, or a piece of paper that can be transferred to a computer via cable and scanner to translate a base character image to an address on a computer and communication network. The template is a plastic stencil. There are cutouts for eyelash character modifiers. There is a cut out of the base character image. The dimensions of said device could be roughly, two inches by three Inches by one eighth of an inch or thinner.

10-2. A sound device that is stand alone or integrated with another media device has buttons labeled with character modifiers. When buttons are pressed they play different frequencies or musical notes that can be used to translate character modifier code of a modified character image into an address. An individual can press a sequence of buttons labeled with character modifiers to play frequencies or musical notes into a sound recognizable device hooked up to a computer programmed to translate the frequency based code from a modified base character image and convert it to an address on a computer and communication network, similar to the touch tone telephone. There is a microphone and a speaker and a display that shows the value of said facial code. There is a button that chooses one of the twenty hair follicles. There is an illuminated led display of said facial features. The Dimensions of this device can be roughly three inches by two inches by one half of an inch.

10-3. A character image can be modified to allow an individual to set the unique character modifier sequence using an adjustable type band ink stamp that is capable of printing character image modifier code from and within a mechanism that is able to print to substrate such as paper, wood, metal and others to leave a mark that can be scanned and recognized on a computer and communication network. There are dials used to rotate said facial feature character modifiers. A twist off ink reservoir that attaches to said type band ink stamp. Dials are turned by hand. Memory capabilities within the mechanism can be added with a microprocessor that can translate a modified base character image to a directory location on a computer or communication network.

10-4. A graphical interface, on a web page utilizes an Internet browser as a device for translating modified character images into a location on a computer and computer network, using a mouse, keyboard, and other means. This is done by providing twenty boxes that represent character modifiers for the character image in the center of the page. A user is shown through imagery how to operate web page. This is a graphical interface is designed to be understood graphically by one who is savvy of the Internet and not necessarily speaks English. Once understood a user can fill in the twenty boxes and proceed to the location predetermined by modified character image user is seeking. A user can use this form to create a modified base character image also.

10-5. Base character modifier stickers designed for devices that have buttons or pressure sensitive controllers. Telephones, computer keyboards, and remote controls and any other device that can access a database or a communication network and have buttons with preprogrammed functions. These stickers have the legend of the values of a particular scheme that exists within a set of base character image modifiers. These character modifiers can be used to modify and enhance the profile and course of functions these devices possess when communicating with other devices as well as a computer and communication network. When a sticker with a legend to code is appended to a remote control used to control a device one can enter a location one wants to connect with using modified character image. The code illustrated in 10-5 is similar to the code described in FIG. 1 through FIG. 9. This code puts a number value on hair follicle character modifiers zero through nine exist only on the upper eyelids of a character image of a face. In this scheme there are three different kind of eyelash character modifiers. The shortest eyelash follicle is the first alphanumeric in modified character image. This is followed by the second shortest eyelash character modifier and then the third shortest eyelash character modifier. There are four examples of modified character images and the alphanumeric they translate too. There is also an example of what these stickers would look like on a phone.

10-6. is an illustration on how a base character image can alter the address of an existing recognizable symbol being used for the purpose of arbitrary addressing on a computer and communication network. The first image is an image of an existing symbol used for finding information on a computer and communication network under one format known as barcode recognition. The next illustration shows how this code can be changed to another address on a communication network providing the colon c (:C) is the beginning of a web address. The next image shows other image features that can be associated and recognized with an emoticon that is a web address. Image recognition software recognizes the arms, feet, hat, briefcase and phone that the image shows making it a candidate for an address on a computer information network. The next image shows all the same features as the others except an eyelash code is present also. This emoticon now takes on three addresses. A computer can be programmed to recognize eyelash and follicle character modifiers first and then look for other information to help guide a user of a computer to a more specific location, or too authorize a task for the registration of a particular document or to send a stream of information to a said user or to act as a secondary address to one of the three addresses being displayed within image or eyelash and follicle character modifiers. The imagery could also be a back up address in case recognition of eyelash and follicle character modifiers is not established.

10-7. A flow chart showing how a photograph, drawing, illustration, or file type can be scanned, recognized, translated, and resolved on a computer to get to a directory on a computer and communication network. This is possible when a character image that is an address is present on the media to be scanned. The device used to scan a modified character image, takes that information and sends it through the Internet to a server where a match is looked for. The server sends back any match found.

10-8. Three images showing how modified character images can have subdirectories on a computer as well as upper level directories that are accessible through text recognition as well as image recognition. Recognizable imagery built around a web address, allows a user to add any keywords one wants to ones address to draw focus to the key word along side an image. An upper-level directory next to a modified character can be utilized as well to extend the usage of a modified character image.

10-9 This illustration is similar to that in 10-5 except instead of stickers to direct some one how to dial a telephone, a scanned modified base character image in a telephone number leads to a computer and a communication network when recognized by a scanning device and used with a computer programmed for dialing a phone number and translating the scanned character modifiers to an extension code that leads to a computer and communication network. This illustration shows a regular phone number. Then shows a phone number when you draw attention to a character image that exists within said phone number.

10-10 A flow-chart shows how a piece of mail with a modified base character image points to a real address. A piece of mail bearing a modified character image can aid a postal worker to find the address of said mail from any computer in the world that is hooked up to the Internet. Postal worker scans a modified character image through a scanner which goes through a computer, then onto the Internet and to the base character images server. The address is found in a database existing on server and sent back through the Internet to postal worker.

10-11. Is an example of how simultaneous broadcast and other media can be an arbitrary address on a communication network when acting as an attachment to a modified base character image that is pre-coded as a broadcast address or a particular media type address on a computer and communication network. A pre-coded modified character image can contain a certain computer command within its modifications that can execute a program in pre-programmed computerized devices such as a preset human or non-human controlled camera/microphone and any other device capable of recording and distinguishing a signal from a pre-coded modified character image and its surroundings while in scan recognition mode at a single or multiple locations.

A pre-coded command could consist of a particular image or a series of led lights set up around the facial features of a character image. These led lights could flash a signal that can be picked up by cameras/microphones and or other sensors on the network alert and ready to pick up a pre-coded modified base character image signal that exists in the real world or a virtual world. A signal is sent through the Internet to a server programmed to detect and retrieve said command from device transmitting pre-coded modified character image.

A server then records pre-coded modified character image along with all information surrounding pre-coded modified character image and stores it on server hard drive. Server then analyzes and separates all machine recognizable formats and makes it ready for a query in a variety of formats on a computer and a communication network. Query consists of a particular modified character image or the information surrounding a modified character image. Query is made through a computer which is on the Internet. Query is detected through server and information is extracted from server, and any match is sent back to origin of query.

Once a client reaches the results of a query, a preprogrammed guide existing visually in a real or virtual environment comprised of modified character images in the form of an animation could project itself through a clients computer reflecting emotion and imagery toward the content of someone's web page. Each projection or any frame of said projection can be its own modified character image address, which would point to another location on a computer and communication network.

Using streaming modified character images is a language recognizable and accessible through out the whole world. A language of modified character imagery is translatable as each word is in the dictionary. A language of emotions that is recognized by human beings when visualized or felt in some way by a human or non-human species can be assigned an image that exists as a location on a computer and communication network. A sentence can be translated into an animation that is fully definable online in any language, because the imagery and emotions that emulate these words are the same as the definitions in most cases. Descriptions of said modified character imagery could exist in all languages at the location of these modified character images online.

Figures 10, 11:
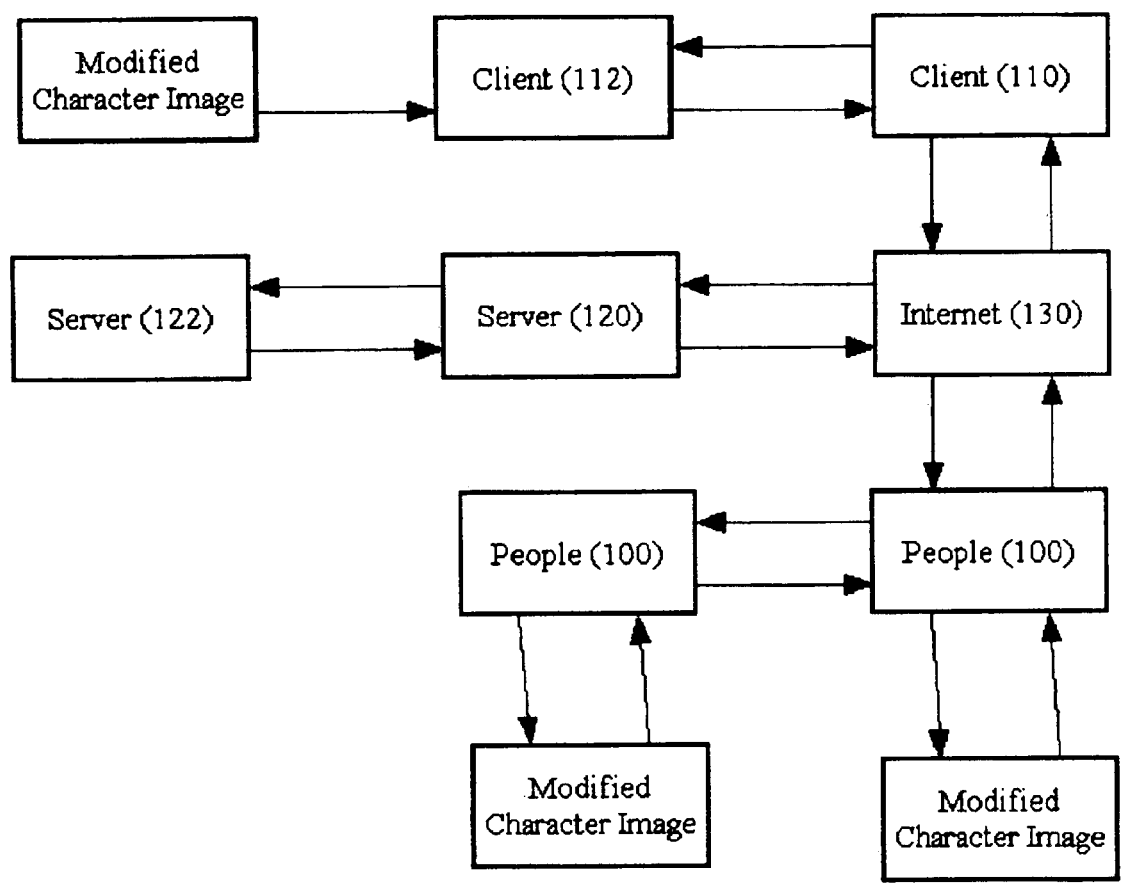
FIG. 11 is a flow chart showing how to encode a character image.
Figure 11:
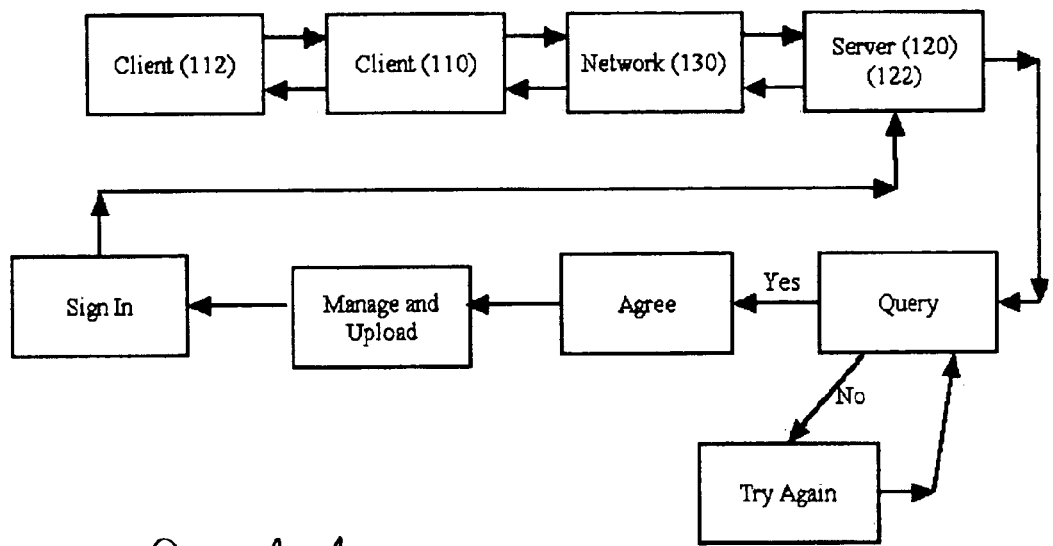

FIG. 11. is a flow chart showing the method of encoding a base character image. Too encode a character image with facial features and other information associated with it one would need to go to a character image that is a domain name on the Internet using an Internet browser. At this location there is a blank palette with a choice of base character image schemes one can use to create their own unique modified character image/address. Pre-made character modifiers exist for the choosing as well as a series of online paint tools and multi-lingual text tools is available. One can use these tools to create their address or multiple addresses on a computer and communication network. An address can also be created by just inputting the numeric value of said modification values to character image.

After a modified character image is chosen it is assigned its numeric address by pressing the "create" button like illustrated in FIG. 10-4. A unique address is created and ones online existence management options exist as well as templates for creating an online presence. A client can also check other databases on the Internet for the registration of other information.

If any queries for a modified character image is unavailable, a visible prompt consisting of a try again window, would allow a user to change ones modified character image address.

Figure 12:
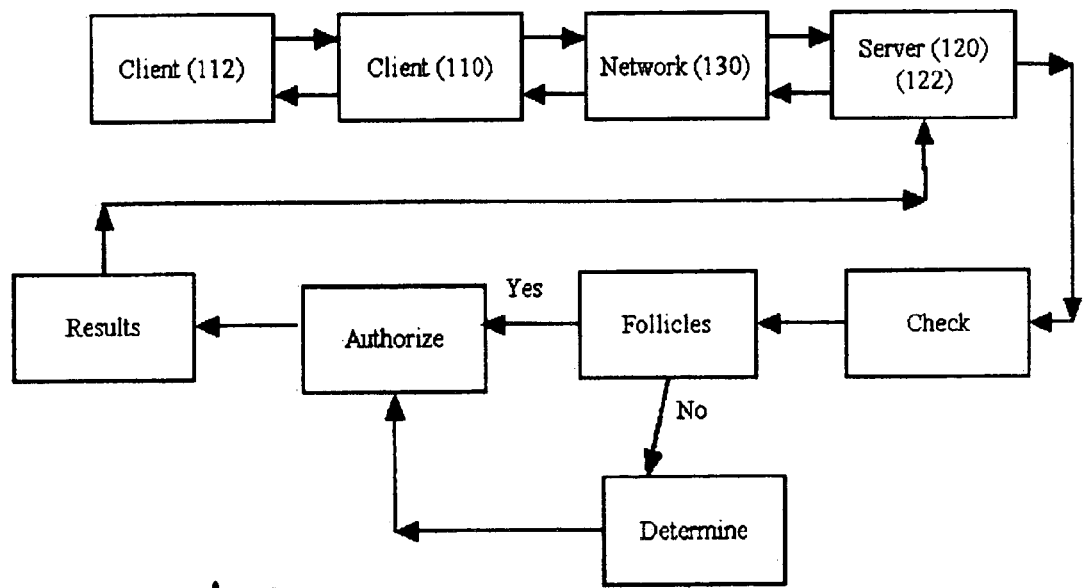
FIG. 12 is a flow chart showing how to decode a character image.

FIG. 12 is a flow chart showing the method of Decoding. To decode a modified character image one must enter it from a machine which has character image storage capabilities. The stored information would go through a computer that is on the Internet to a web page on a server with a character image as a domain name. Once at character image named web page, prompts exist guiding a user in uploading and entering the modified character images information too server. Server checks information for follicle character modifiers first. If follicle character modifiers exist, server will check for any other attached media and if any precoded commands exist within the modified character image. If follicle character modifiers do not exist, a match for any media attached to a character image will be determined. After determining what to do server will authorize and send the results through server on to the Internet into a users computer and then presented through a web browser or any device able to translate the protocol necessary for communication on a computer and communication network.

Figure 13:
FIG. 13 is an example of a domain name on the worldwide web that is a base character image.
Figure 13:

FIG. 13 Is an example of a domain name on the worldwide web that is a base character image of an earthworm. The 8-1 is the face and head of the earthworm and the .com is the body of the earthworm. The eyes, nose and mouth of the said face are comprised of ASCII text font face style called century gothic. The four other examples in 132 are custom styled ASCII text fonts I designed myself. These fonts can be loaded on any computer for the task of producing and recognizing as ASCII text.

Once a modified character image is converted to a font it is then a candidate for character recognition along with image recognition making it recognizable as indicia for addressing under multiple formats.

Figure 14:
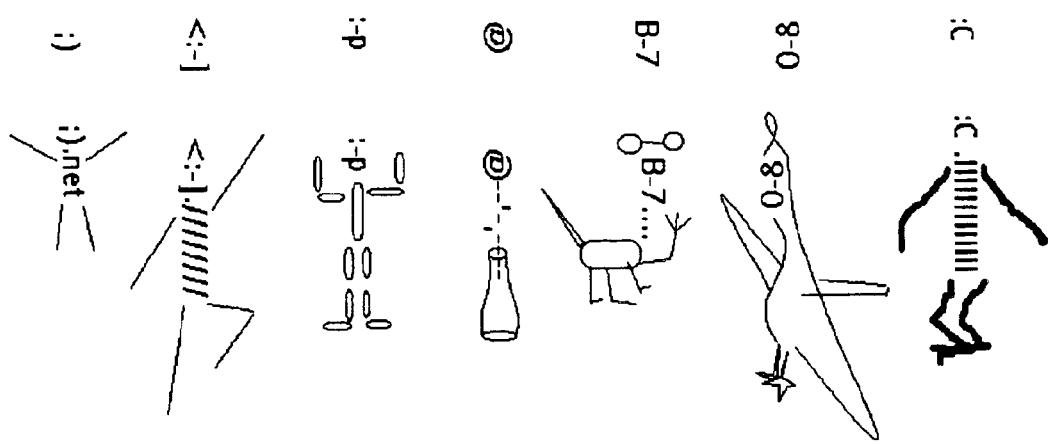
FIG. 14 is illustrations of multi-addressed modified character images.

FIG. 14 Illustrates character images and modified character images coded with an address. There is a row of seven character images. There is a winking smiley face base character image constructed from the ASCII text of a typing keyboard comprising the semi-colon key and the close parenthesis key. ;) is not recognizable as a domain name on the Internet. It is possible that one day Internet addresses can contain punctuations.

B-7 and 0-8 are Internet web addresses when next to a .com. There is a row of seven modified character images that are unique and can be unique addresses on the Internet when a base character image that exists within it is a domain name on a computer and communication network and can be recognized as a character image by a machine that will recognize it along with recognizing any other machine recognizable media.

Figure 15:
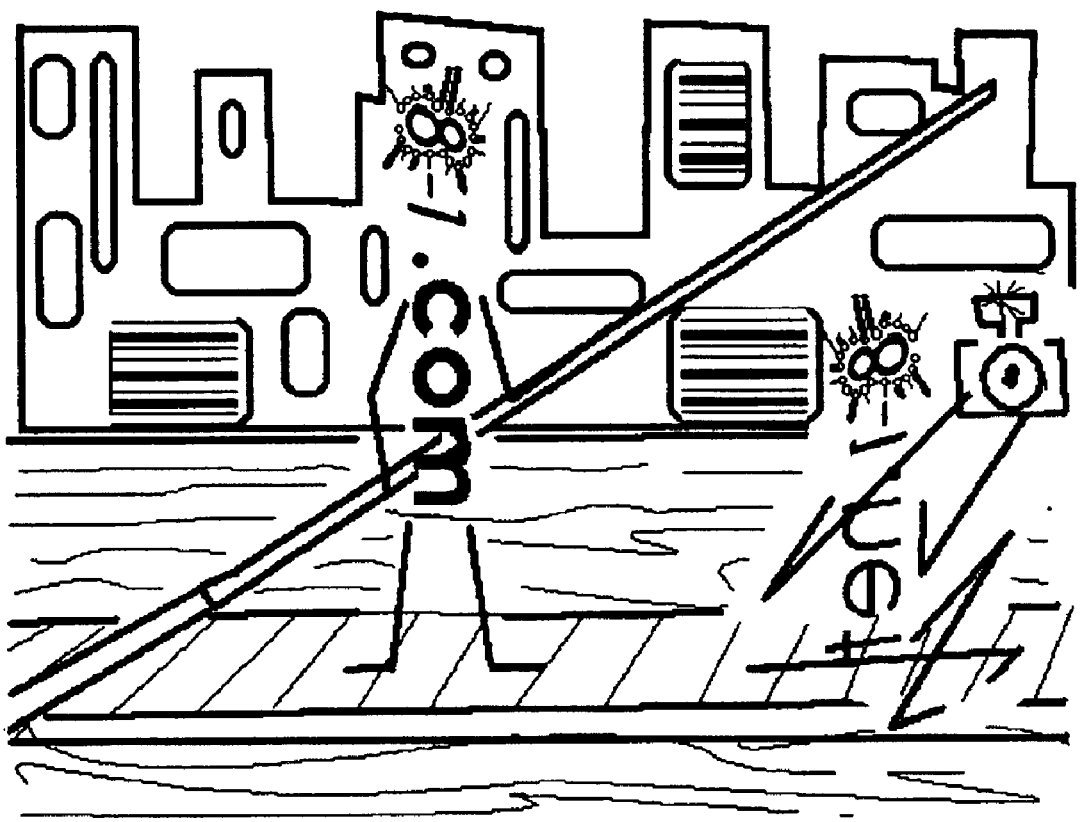
FIG. 15 illustrates a modified character image with multiple addresses comprised within one image

FIG. 15 Illustrates a modified character image with multiple addresses comprised within one image. The image is two people on a boat in Venice Italy. One person is pushing the boat with a long pole that is going down into the water. The other person is holding a camera pointing out at us the viewers. When the image is scanned and sent to a computer programmed to first find the specific text that comprises a character image the results would point to the 8-1.com you see in the picture. This is the first address. This said computer that controlled the program to search for said text can then search for facial features around said pre-defined character image.

Once facial features are found a programmed computer can associate the designated address to said programmed computer scanning the image. If there are no other pre-destined machine-readable codes within said image the address would be already resolved. In this particular image there are more addresses. There are three bar codes. The bar-code lays horizontally and takes on the appearance of venetian blinds in a window over looking a water canal, as well as taking on the appearance of a corrugated gates at the entrance of a building right in front of a water canal. Each one of these bar codes can be different locations or the same location as the facial features on a computer and communication network. When barcode takes on the same address it is acting as an alternative measure for the secure delivery to an address through machine recognition. After a computer programmed to find these formats have found all these formats it would have a background image left over. Background image is recognizable as an image in an image retrieval database also. This creates another valid address for a programmed computer to follow.

Using this system with today's technology will allow an almost infinite amount of addresses that could also be described as more then the maximum possible on a computer system based on pixels, nodes and directory configuration as well as storage capabilities because the imagination one can use to create an address is most definitely infinite using this said system.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

I claim:

1. A method for requesting a network resource from an identifier including at least one character image element comprising:

detecting said at least one character image element from the identifier wherein the image is an emoticon in the form of a face, said identifier including a character image of an emoticon, said at least one character image element including a base image identifier and character modifier identifier;

generating at least one uniform resource identifier component corresponding to said at least one character image element;

generating a uniform resource locator (URL) including said at least one uniform resource identifier component; and, requesting the network resource with said URL.

2. The method as set forth in claim 1, wherein said face is formed from alphanumeric characters.

3. The method as set forth in claim 2, wherein said alphanumeric characters can include characters such as 8-1.

4. A method for requesting a network resource from an identifier including at least one character image element comprising:

detecting said at least one character image element from the identifier, said identifier including a character image, said at least one character image element including a base image identifier and character modifier identifier wherein said character modifier identifier is in a form of machine readable code, said machine readable code in a form of at least one of a hair follicle and eyelash;

generating at least one uniform resource identifier component corresponding to said at least one character image element;

generating a uniform resource locator (URL) including said at least one uniform resource identifier component and, requesting the network resource with said URL.

5. The method as set forth in claim 4, wherein said eyelash includes attributes of at least one of a length and thickness and said hair follicle capable of providing a reference point for detecting said at least one character image element.

6. The method as set forth in claim 4, wherein said character image is in a form of an emoticon.

7. The method as set forth in claim 6, wherein said emoticon is in a form of a face.

8. The method as set forth in claim 7, wherein said face is formed from alphanumeric characters.

9. The method as set forth in claim 8, wherein said alphanumeric characters can include characters such as 8-1.

10. The method as set forth in claim 9, wherein the 8 from said characters 8-1 is a visual metaphor for eyelids of eyes, said eyelash extending from said hair follicle, said hair follicle surrounding said eyelids, and said hair follicle representing a value of 0.

11. The method as set forth in claim 10, wherein said attributes of said eyelash is selected from a group of name/value pairs including a thin short eyelash=1, thin long eyelash=2, thick short eyelash=3, and thick long eyelash=4.

12. The method as set forth in claim 11, wherein said short eyelash is no longer than one third the length of the longest eyelash and said thin eyelash no thicker then one half the thickness of the thickest eyelash.

13. The method as set forth in claim 12, wherein said generating said at least one uniform resource identifier component corresponding to said at least one character image element includes generating at least one uniform resource identifier corresponding to said one or more name/value pairs.

\* \* \* \* \*